United States Patent [19]

Schoen

[11] Patent Number: 5,604,595
[45] Date of Patent: Feb. 18, 1997

[54] LONG STAND-OFF RANGE DIFFERENTIAL ABSORPTION TOMOGRAPHIC ATMOSPHERIC TRACE SUBSTANCES SENSOR SYSTEMS UTILIZING BISTATIC CONFIGURATIONS OF AIRBORNE AND SATELLITE LASER SOURCE AND DETETOR REFLECTOR PLATFORMS

[76] Inventor: Neil C. Schoen, 9817 Freestate Pl., Gaithersburg, Md. 20879

[21] Appl. No.: 375,614

[22] Filed: Jan. 20, 1995

[51] Int. Cl.⁶ .................................................. G01N 21/00
[52] U.S. Cl. .................... 356/432; 356/436; 356/437; 356/438; 356/73; 250/573; 250/574
[58] Field of Search ........................ 356/432, 436–438, 356/73, 320, 407; 250/573, 574

[56] References Cited

U.S. PATENT DOCUMENTS

| | | | |
|---|---|---|---|
| 3,532,428 | 10/1970 | Googan | 356/300 |
| 3,768,908 | 10/1973 | Zaromb | 356/301 |
| 4,386,854 | 6/1983 | Byer | 356/438 |
| 4,483,614 | 11/1984 | Rogers | 356/437 |
| 5,428,447 | 6/1995 | Toida | 356/432 |

*Primary Examiner*—Frank Gonzalez
*Assistant Examiner*—Jason D. Eisenberg

[57] ABSTRACT

A long-range, wide-area remote sensor system(s) to detect trace levels of atmospheric constituents using bistatic configurations to measure differential absorption (BDIAL) of source beams tuned to the absorption line center and off-peak "wing" in the spectra of species of interest. Potential platforms for the probe beam and detector subsystems include satellites and airborne vehicles, and mapping of large geographical regions is accomplished by tomographic reconstruction of recorded columnar absorption data. The use of bistatic geometries reduces power requirements on the probe beam, as compared to standard backscatter DIAL, and allows detection with platforms at large stand-off ranges, subject to atmospheric conditions. Operation in spectral regions including UV, visible and IR is feasible, provided that there are no overlapping absorption lines when many substances are present. Use of multiple frequency sources and multi-spectral detectors will reduce identification ambiguities. A variant bistatic configuration, using corner cube or gimbaled reflectors will also allow similar stand-off and area coverage to a system with a remote detector, but with much higher source beams and/or lower sensitivities due to return path losses. In excellent atmospheric conditions, detector sensitivities to parts-per-billion (ppb) are possible.

4 Claims, 6 Drawing Sheets

$I = I_o e^{-ar}$ $C = f(I(f_2)/I(f_1))$ $sum_j = A_{i=1}$ $sum_j C_{ij} = A_i$ $sum_i C_{ij} = A_j$

LONG STAND-OFF RANGE DIFFERENTIAL ABSORPTION TOMOGRAPHIC ATMOSPHERIC TRACE SUBSTANCES SENSOR SYSTEMS UTILIZING BISTATIC CONFIGURATIONS OF AIRBORNE AND SATELLITE LASER SOURCE AND DETETOR REFLECTOR PLATFORMS

BACKGROUND

The use of differential absorption LADAR (DIAL) for trace substance detection because commonplace in the late 1960s, after the invention of the laser (1960) made narrow line width, coherent sources feasible at high powers. However, the application of this technique has been confined to short-range atmospheric paths due to concentration on use of backscatter signals, which suffer from round-trip absorption and $1/r^2$ losses due to isotropic scattering/absorption. Use in hostile or remote locations precluded separately located receivers/detectors. The advent of a variety of remote and/or inexpensive platforms (e.g., satellite sensors, unmanned aerial vehicles [UAVs] and other airborne platforms aerostats/balloons/aircraft) is a critical factor in the development and feasibility of the systems defined herein.

Current DIAL systems consist of a transmitter and detector system with shared optics, to insure that the outgoing and return paths are identical, and rely on a short, dual frequency pulse of radiation to backscatter from a region of the atmosphere (whose location depends on the delay time of the return pulse). The backscattered radiation will indicate detection of a substance of interest if the ratio of the absorption line center frequency to the wing frequency differs statistically from unity. The ability to detect the signal will depend on the amount of radiation backscattered (which varies as $1/r^2$, the atmospheric absorption and the detector sensitivity and noise characteristics).

SUMMARY OF THE INVENTION

The present invention, described herein, utilizes a separately located detector, beyond the range of the suspected location of the substance(s) of interest, to measure the differential absorption. It detects the more concentrated source laser beam, as opposed to the isotropically scattered radiation in the conventional backscatter DIAL, and thus should be more sensitive and/or allow longer ranges for detection.

While the conventional DIAL can determine concentrations at different range locations (from return signal time gating), the present invention utilizes a tomographic reconstruction to determine the three-dimensional distribution of the trace substance, which requires repeated measurements through different angular paths. If a corner cube or other reflector is used, the additional beam divergence and round-trip absorption can significantly lower the detection levels/ sensitivity or require large increases in laser power; but the reduction in cost may warrant this configuration.

The use of a tomographic approach to mapping the distribution of the trace substance allows a reduced number of measurements, of a simpler nature (no time-gating), and provides large area coverage, depending on the flight patterns of the two platforms. The use of aircraft platforms (including UAVs) allows the most flexibility in selecting the region to be scanned, but will take more time to collect data due to the low velocity of the platforms (UAVs will fly as slow as 70 miles/hour). Therefore, complete scans of large regions (e.g., 100 mi.×100 mi.) might take 2–4 hours, and thus rapid changes in the concentration of substances of interest would not be detectable. This can be partially offset by using more platforms, or faster platforms. Satellite receivers move quite rapidly (7 km/sec) and thus can be used to rapidly scan large regions, but lack flexibility due to fixed orbits. Use of constellations of satellites can in some cases remedy this constraint.

DESCRIPTION OF THE DRAWINGS

In the following drawings, the same elements carry the same element reference numbers throughout the Figures, and are defined and described in the specification text associated with the first appearance of that element in a Figure.

DETAILED DESCRIPTION OF PREFERRED EMBODIMENTS

Figures 1, 4:
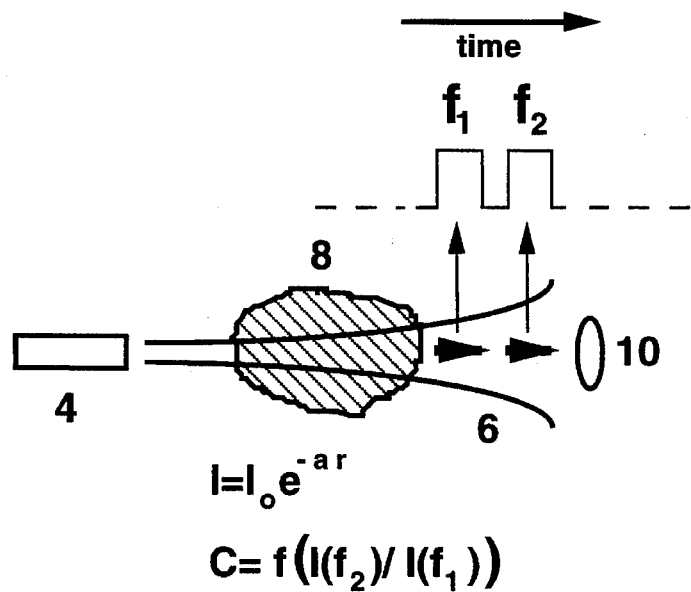
FIG. 1 shows the basic technique for making DIAL measurements.
FIG. 4 illustrates the tomography technique using a simple square scan pattern and the resultant coupled linear equations to solve for the grid partial absorptions or concentrations.
Figure 2:
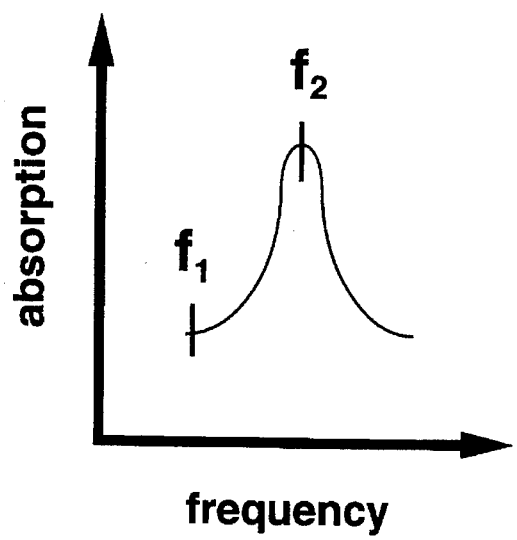
FIG. 2 shows an adsorption line profile and the definition of the two frequencies used in DIAL measurements.
Figure 3:
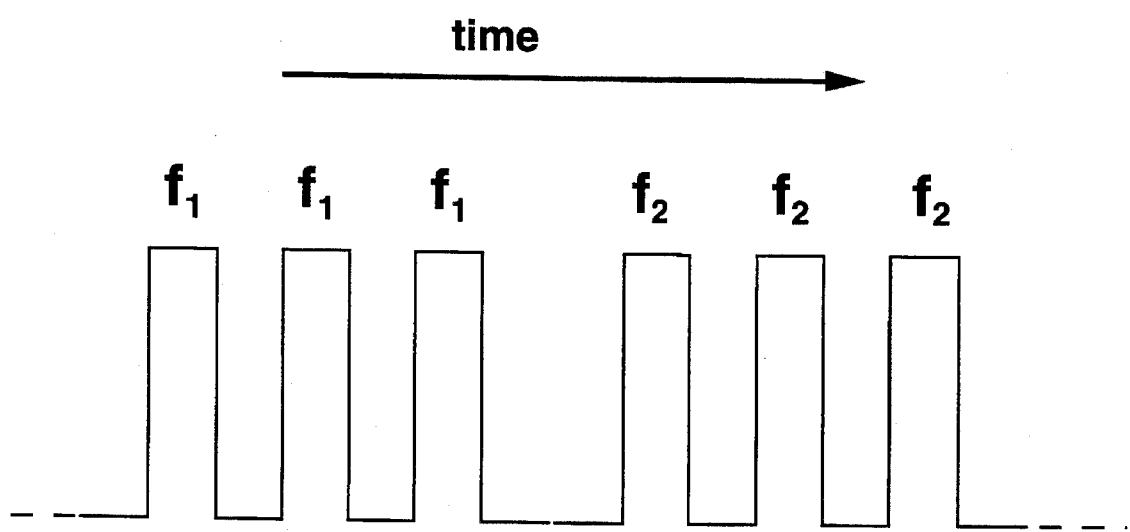
FIG. 3 shows the nature of the laser beam and a time structure option for laser pulses of the two different frequencies used in the laser transmitter or source subsystem.

The basic DIAL technique, as shown in FIG. 1, is characterized by a dual-frequency laser transmitter 4 which transmits laser beams 6 at wavelength $f_1$ and $f_2$, through the atmosphere containing plumes, "clouds", or regions of uniform concentrations of trace substances 8 to be measured, whereupon the attenuated beams strike a detector subsystem 10 which measures the relative intensities of the laser energy of the two frequencies. The energy at the absorption line center frequency $f_2$ is reduced by the absorption and possible isotropic re-radiation, caused by the material 8, whereas the off-peak or "wing" frequency beam is relatively unabsorbed by the substance, but is close enough in frequency to undergo the same scattering and propagation changes that the other frequency beam experiences. Thus, the columnar concentration is proportional to the quantify $(1-I(f_2)/I(f_1))$, assuming no saturation effects have occurred (e.g., total absorption).

The tomographic reconstruction technique to map the two- or three-dimensional distribution of the trace substance is shown in FIG. 4. The absorption measurements $A_i$ and $A_j$ correspond to sums of individual "cell" absorptions (e.g., $C_{23}$) by rows and columns. This creates a series of coupled linear equations which can be solved for the individual cell $C_{ij}$ absorption levels, and hence, substance concentration levels. By aggregating cells in larger subgroups, one can obtain additional constraining equations to produce a deterministic output (i.e., equal number of equations and unknowns); groups of 4 cells have sufficient equations to match the unknowns.

Both DIAL and tomography are well-known techniques; their combination in conjunction with bistatic platforms (transmit/defect) constitute the substance of this invention, as indicated in the following discussions. Each possible configuration, as illustrated in the figures, is briefly described, and analyses is presented for representative cases for the two major categories of geometry; ground-to-space and air-to-air.

Figure 6:
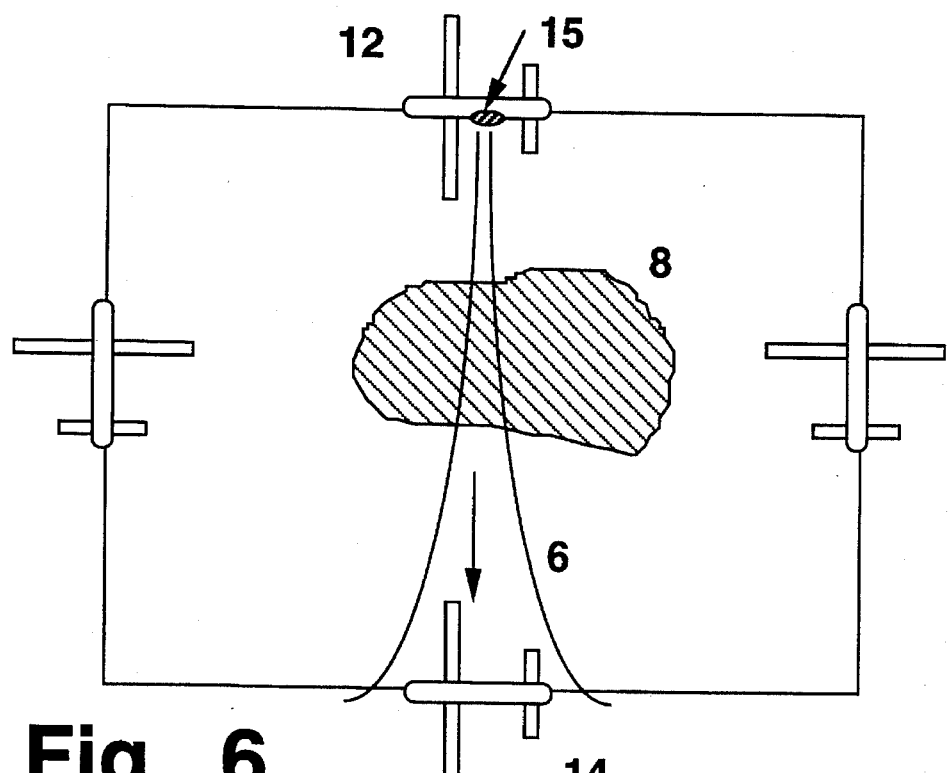
FIG. 6 shows a rectangular tomographic scan pattern using two sets of two UAVs flying parallel paths in othogonal directions, with one UAV of each pair representing a transmitter platform and one a detector platform.
Figure 5:
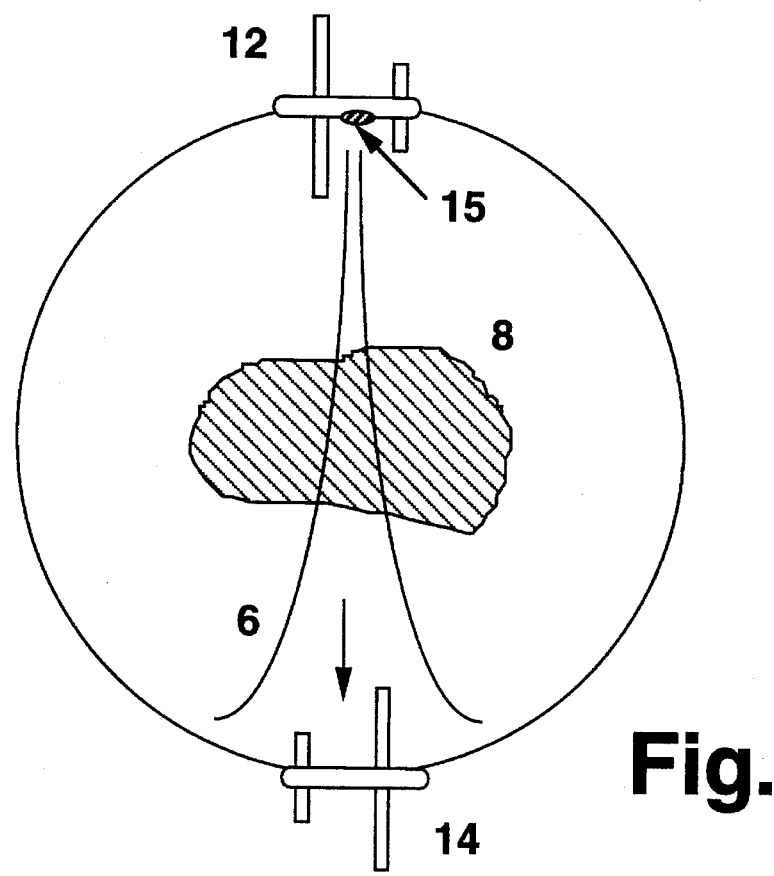
FIG. 5 shows a simple counterclockwise circular tomographic scan pattern using two UAVs representing a transmitter and a detector platform.

FIG. 5 and 6 shows two simple and fully sampled tomography configurations for air-to-air platforms. The aircraft with the laser probe beam/transmitter 12 and the receiving aircraft 14 perform an acquisition and track operation so as to properly lock the probe beam onto the detector, by means of a reflected signal and a servo control loop 15 on the transmitter gimbal assembly, employing a quadrant detector to provide gimbal correction signals. The process is similar to that used by astronomers to lock telescopes to moving objects such as satellites illuminated by the sun. Once track-lock is achieved, the aircraft can commence a pre-planned flight pattern (circular or parallel as shown) and continue to maintain lock. Because pointing accuracies of the order of hundreds of microradians are anticipated, the expected disturbances from aircraft vibration, role, pitch, and yaw motion should be able to be compensated for by the servo loop.

Figure 7:
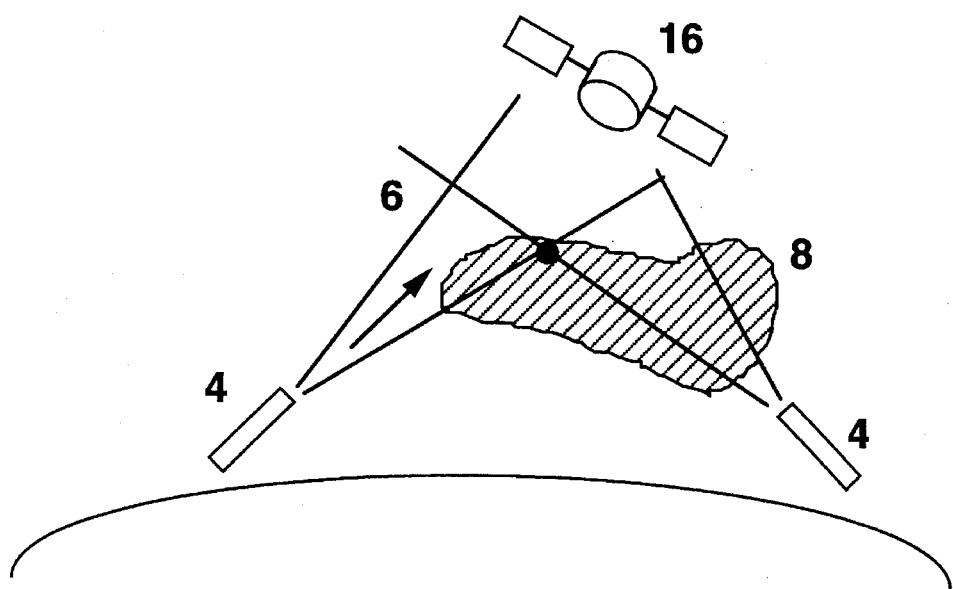
FIG. 7 shows a ground-to-satellite configuration with two ground-based laser transmitters to provide tomographic scan coverage.

FIG. 7 shows the configuration for a ground-to-space geometry, in which the satellite detector gimbal system can "stare" at a fixed ground location for tens of seconds. This allows data collection for a significant fraction of the viewing time. Alternatively, a wide field-of-view (WFOV) detector could be used to eliminate expensive gimbal assemblies. Multiple ground sensors allow needed path geometries for tomographic reconstruction, which may be undersampled if sufficient satellites and/or ground probe beams are not available. Another option is to utilize a reflector system (corner cube or gimbaled mirror) instead on a satellite sensor. This would reduce costs, but would require higher power lasers to compensate for the round trip path absorption and beam divergence if sensitivity is not to be degraded.

Figure 8:
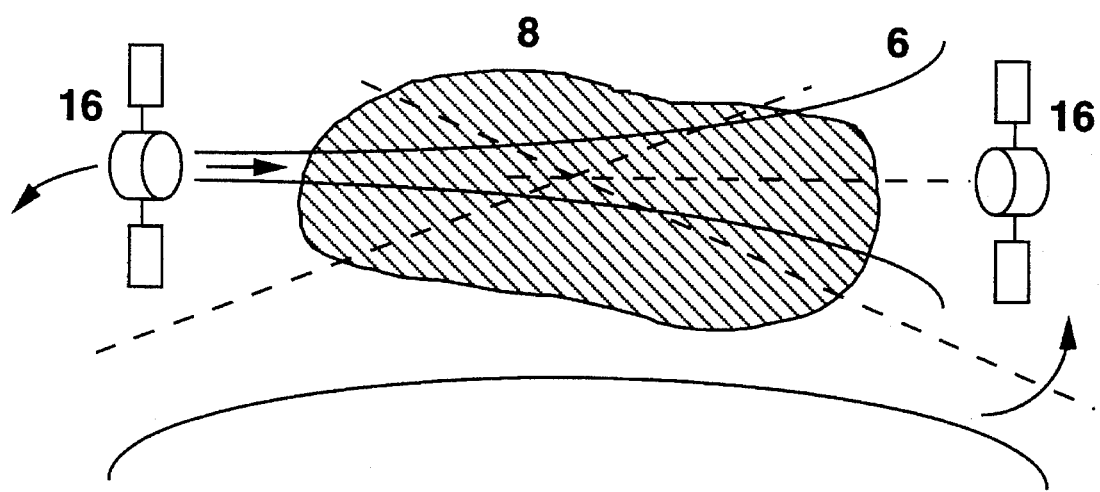
FIG. 8 shows a satellite-to-satellite configuration in which the orbital rotation of the satellites provides partial tomographic scan coverage.

FIG. 8 shows a space-to-space configuration, which tracking-locked satellite pairs 16 sample the earth limb and provide multiple view paths for tomographic reconstruction. A gravity gradient attitude control system would allow continued track lock, since spacecraft rotation would be "automatic."

Figure 9:
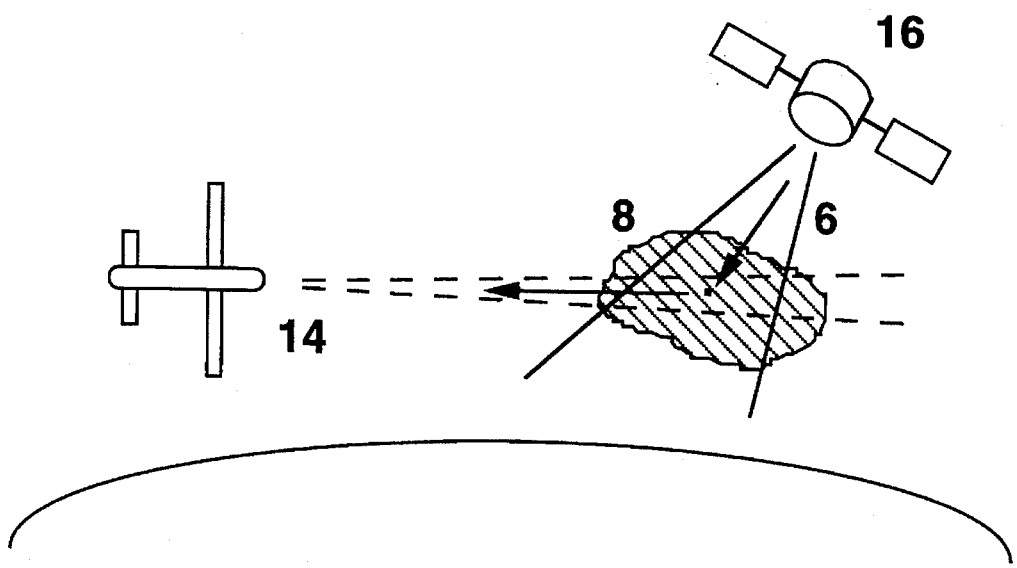
FIG. 9 shows a satellite-to-aircraft configuration which uses a scattering measurement technique with a satellite-based laser transmitter for spot measurements.

FIG. 9 illustrates another hybrid configuration, space-to-air, with the satellite providing the laser probe beam. This bistatic approach utilizes a scattering process, as opposed to the "straight-through" beam attenuation technique previously described, but it is a mobile bistatic technique. Since the direction of the probe beam and its motion are known, the aircraft receiver can maintain the proper pointing direction to intersect the laser beam. That intersection defines the region in which trace substance data would be collected. Time tagging could also be used, or the system could just report the presence of the substance without mapping the distribution. The aircraft would not have to emit any radiation, and thus could maintain a low detection or "stealthy" condition for military applications.

Figure 10:
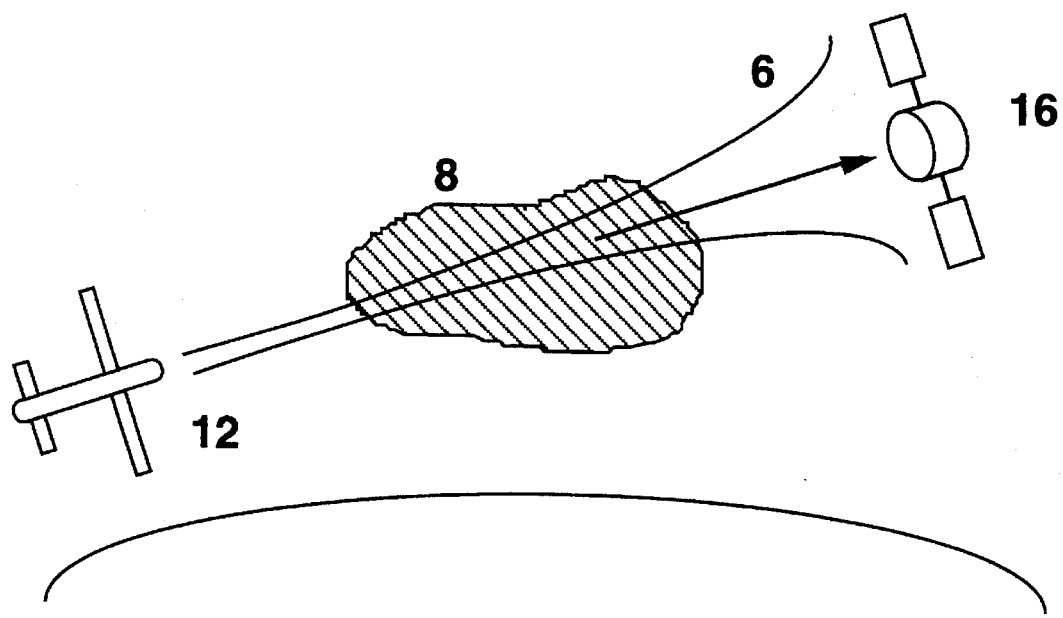
FIG. 10 shows an aircraft-to-satellite configuration with an aircraft-based laser transmitter for columnar measurements, or tomographic measurements when paired with another set of platforms.

FIG. 10 shows a more "standard" bistatic configuration for air-to-space geometry; the aircraft would carry the probe beam/transmitter. Because the number and orientation of beams through regions of interest are limited, the tomographic reconstruction will likely be incomplete. However, the presence of the trace substance of interest would be determined, even if detailed distributions are not obtained.

Figure 11:
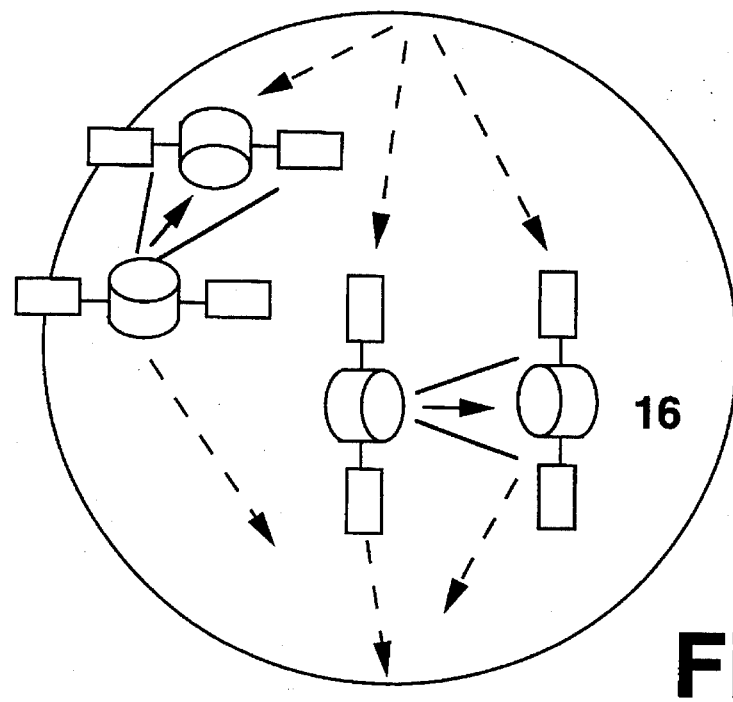
FIG. 11 shows a satellite constellation configuration using pairs of satellites within an orbital ring and pairs of satellites in adjacent orbital rings to provide partial tomographic coverage.

FIG. 11 illustrates how multiple orbit/ring constellations can provide the additional view paths to improve the coverage and tomographic reconstruction for this space-to-space embodiment of the invention. If the satellites are sun synchronous, the measurements will be repeated at the same time of the day for any region. The altitude and spacing of the satellites in a given ring, and the ring separations, will determine the altitude of the earth tangent parallel plane, and thus the region of the atmosphere that is being sampled at a given latitude. The satellites would operate in pairs, both cross-ring and intra-ring.

Figure 12:
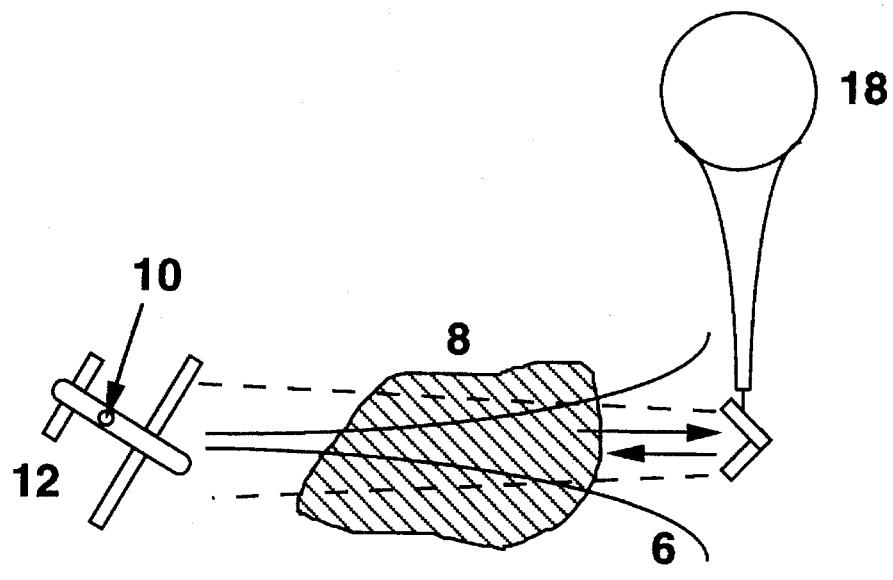
FIG. 12 shows an aircraft-to-balloon configuration using a corner cube reflector(s) in which the aircraft can fly a circular pattern around the balloon to achieve large-area columnar measurements.

FIG. 12 illustrates another air-to-air hybrid configuration, using an aircraft and balloon/aerostat. The balloon could be equipped either with a gimbaled detector or a series of corner cubes. The aircraft would execute a circular flight pattern around the balloon. This system would not be a tomographic system, but could provide columnar densities for trace substance presence detection along a vector direction.

The following calculations demonstrate the feasibility of ground-to-space and air-to-air systems.

The following calculations support the assessment of the use of satellite sensors for bistatic LADAR using ground based laser sources for probing atmospheric trace substance concentrations. The following calculations define some of the basic parameters from input data provided for a soon to be launched satellite sensor.

$F := 3.7$      $F = f\#$ of the sensor $FL := 28.5$      $FL =$ focal length (cm)

$AD := \left(\dfrac{FL}{F}\right)^2 \cdot \dfrac{\pi}{4}$      $AD =$ the detector area (square cm)

$AD = 46.599$

The sensor pixel field of view (IFOV) is determined by the focal plane array (FPA) factors.

$PW := 9 \cdot 10^{-6}$      $PW =$ pixel width (m)

$IFOV := \dfrac{PW}{FL \cdot 0.01}$      $IFOV =$ pixel instantaneous $FOV$ in radians $IFOV = 3.158 \cdot 10^{-5}$ The FPA has four million pixels in the array and thus the FPA field of regard (IFOR) can be calculated.

$N := 2 \cdot 10^3$     $N$ = number of pixels per side
$L := N \cdot PW$        $L$ = length of the FPA
$L = 0.018$ $$IFOR := \frac{L}{FL \cdot 0.01}$$     IFOR = the FPA instantaneous FOR radians $IFOR = 0.063$ The FPA frame size can be determined from the satellite orbit altitude and the IFOR.

| | |
|---|---|
| $H := 475$ | $H$ = satellite altitude (km) |
| $FR := H \cdot IFOR$ | $FR$ = frame size in km |
| $FR = 30$ | Coverage area is 900 square km |

The pixel resolution in meters is $$R := 30 \cdot \frac{10^3}{N}$$

$R = 15$

The sensor bandwidths are as follows:

| | |
|---|---|
| G | 500–590 nm |
| R | 610–680 nm |
| NIR | 790–890 nm |

The next calculation deals with the sensor signal-to-noise ratio, where the noise will be considered the earth background signal. The background signal was obtained from GSFC from data recorded by the Landsat TM satellite, for a 34 degree sun angle for the G band.

| | |
|---|---|
| $SS := 40.0$ | $SS$ = signal (w/sqm-str-micron) |
| $BW := 0.09$ | $BW$ = bandwidth (microns) |
| $STR := IFOV^2$ | $STR$ = subtended angle in str |
| $STR = 9.972 \cdot 10^{-10}$ | |

The energy of all photons collected by the sensor can be calculated as $$ENERGY := \frac{SS}{(10^{-4} \cdot AD \cdot STR \cdot BW)^{-1}}$$

$ENERGY = 1.673 \cdot 10^{-11}$     Energy = watts/pixel $$PIXELFLUX = \frac{ENERGY}{AD \cdot 10^{-4}}$$     PIXEL- = flux FLUX density $PIXELFLUX = 3.59 \cdot 10^{-9}$     Units are w/square $m$ Using an average wavelength of 0.55 microns, the photon energy and the number of photons striking the FPA can be determined:

$EPHOT := 3.61 \cdot 10^{-19}$     $EPHOT$ = Joules per photon $$NPHOT := \frac{ENERGY}{EPHOT}$$     $NPHOT$ = number of photons $NPHOT = 4.634 \cdot 10^7$ Using the data provided by the supplier for the quantum efficiency as a function of wavelength one finds at 0.55 microns QE=0.3 and therefore the electrons created per CCD pixel is

| | |
|---|---|
| $QE := 0.3$ | |
| $COUNTS := QE \cdot NPHOT$ | |
| $COUNTS = 1.39 \cdot 10^7$ | $COUNTS$ = electrons/sec in CCD |

The above data can be used to check the signal-to-noise (SNR) levels that were available from the satellite developer. A 20 msec integration time was assumed for a full well condition

| | |
|---|---|
| $TINT := 20 \cdot 10^{-3}$ | $TINT$ = integration time |
| $SC := TINT \cdot COUNTS$ | $SC$ = signal counts |
| $NOISE := 200$ | $NOISE$ = read-out noise |
| $B := \frac{SC}{200}$ | $B$ = backgroud pattern noise |
| $SNR := \frac{SC}{\sqrt{SC + B + N^2}}$ | |
| $SNR = 134.408$ | |

This value is reasonably consistent with the curves provided by the developer for the parameters used above. The following calculations deal with the laser power necessary to allow the sensor to detect and measure the laser power above the signal strength calculated above for earth backgrounds. The example used here will be an HF line wavelength (0.6865 microns). The absorption coefficient for this line was obtained from recent references as

| | |
|---|---|
| $ALPHAHF := 1.25 \cdot 10^{-3}$ | $ALPHAHF$ = absorption per km for 10 ppb |

The laser power at orbit can be calculated form the following formula $LAMBDA := 0.6865 \cdot 10^{-6}$     $LAMBDA$ = laser wavelength $A := 7.7 \cdot 10^{-2}$     $A$ = laser aperture radius ($m$)

$P0 := 1.0$     $P0$ = laser power (watts)

$$POWER := (\pi \cdot A^2)^2 \cdot \frac{P0}{LAMBDA^2 \cdot \left(\frac{H}{10^{-3}}\right)^2}$$

$POWER = 0.003$ $PCCD := POWER \cdot AD \cdot 10^{-4}$     $PCCD$ = watts per watt of laser power $PCCD := 1.52 \cdot 10^{-15}$ Using the previously calculated Earth background signal one finds that per watt of laser power $$SNR := \frac{PCCD}{ENERGY}$$

$$SNR = 9.089 \cdot 10^5 \qquad \text{SNR per watt of laser}$$

Thus for a 20:1 SNR one should need about a 20 microwatt laser. However, the spot size of the laser on-orbit for the 6 inch aperture is about $$RSPOT := 1.22 \cdot \left( \frac{LAMBDA}{2.0 \cdot A} \right) \cdot H \cdot 10^3$$

$$RSPOT = 2.583 \qquad RSPOT = \text{spot size radius (m)}$$

$$PACC := \frac{RSPOT}{H \cdot 10^3}$$

$$PACC = 5.439 \cdot 10^{-6} \qquad PACC = \text{pointing accuracy in radians}$$

and the pointing accuracy required is about 5 microradians, a difficult precision to attain. A smaller laser aperture, with a higher power, of the order of a few milliwatts, should allow reasonable pointing accuracy and maintain the 20:1 SNR. An additional calculation dealing with absorption along the path by other species needs to be done to insure that sufficient signal is available at the satellite sensor. The predominant absorber in the HF region of the spectrum is water. For a slant path of 45 degrees, an equivalent atmospheric thickness can be calculated as $$ET := \frac{\int_0^2 e^{-x} \, dx}{\int_0^2 1 \, dx}$$

$$ET = 0.432$$

For the absorption coefficient shown below, and a slant path through two e-folds of the atmosphere, or about 20 km, one finds an absorption factor as below of $$ALPHAWATER := 0.02$$

$$EPATH := 20.0 \cdot \sqrt{2} \cdot ET$$

$$EPATH = 12.228$$

$$ABSFAC := e^{-ALPHAWATER \cdot EPATH}$$

$$ABSFAC = 0.783$$

Thus one needs to increase the laser power about 20% to overcome the background water absorption. The incremental absorption for HF is approximately 2%; thus sufficient integration time is needed to detect a 2% difference between off-peak and on-peak signals for the reference concentration level used in these calculations.

Additional calculations to take into account the effects of turbulence on the laser power density on orbit are not expected to pose serious problems, since the laser power can be increased to offset these effects by increasing the energy density at the satellite orbit. The effects of atmospheric turbulence can be described by the transverse phase coherence length. This factor is based on the turbulence structure factor, which varies with altitude. The formulas below characterize the atmosphere in terms of the coherence length. Since the laser aperture will be less than the coherence length, the turbulence impact on laser spot size should be minimal in the dense lower atmosphere.

| | |
|---|---|
| $theta := 1.0$ | theta = seeing condition (arc sec) |
| $r_0 := theta^{-1} \cdot 10$ | r = transverse coherence length |
| $r_0 = 10$ | r is typically 10 cm in good conditions and 1–2 cm in poor seeing conditions |

Based on the above calculations, modest laser powers (few tens of milliwatts) should allow a safe operation that can detect tens of parts-per-billion level of HF compounds, as highlighted in the specification, for ground-to-satellite geometries.

Air-To-Air Sensor Calculations

The use of UAVs for airborne platforms requires minor modifications in the above calculations, if transmitter and receiver parameters remain unchanged, as highlighted below. The integrated path length calculation based on a platform separation of 2d km with a resulting altitude of h(d) yields for a tangent-to-earth line of sight

| | |
|---|---|
| $Re := 6384$ | $Re$ = radius of earth in km |
| $d := 300.0$ | $d$ = half LOS path |
| $h := \sqrt{Re^2 + d^2} - Re$ | $h$ = altitude for tangency |
| $h = 7.045$ | |

The effective path length factor can be calculated as $$EPLF := \frac{\int_0^{.7045} e^{-h} \, dh}{\int_0^{.7045} 1 \, dh}$$

$$EPLF = 0.718$$

The absorption from water vapor can be computed from, a visibility formula over this effective path length as $$Rvis := 40 \qquad Rvis = \text{visibility in km}$$

$$ABS := e^{-EPLF \cdot 3.912 \cdot \frac{100}{Rvis}}$$

$$ABS := 8.943 \cdot 10^{-4} \qquad \text{Attenuation}$$

Unless visibility is extremely good (i.e., >100 miles), water absorption is prohibitively high. However, for path lengths of the order of <100 km, laser power to provide a substantial signal would be of the order of a few tens of watts for the HF line. Concentrations of the order of 10–20 times as high as the previous reference level would need to be present for detection at 1–2% differences in signal. However, other spectral regions may have lower absorption levels under the line(s) of interest and may allow longer ranges at equivalent sensitivities.

Another difference that must be taken into account is that the receiver will now be looking at a sky background. An estimate of this impact was obtained from a previous study of ground-to-space surveillance by the inventor. This study utilized diffraction limited optics at f#=1, 2.5–5.0 arcsec of "seeing", 26 mile visibility conditions, a Rayleigh scattering model and standard sun background levels for a 45 degree sun angle. Although the aperture sizes, pixel sizes, SNR and water absorption are not identical to the previous calculations, some extrapolations can be made. At near horizon angles, signal magnitudes of the order of M=1 (astronomical units) are needed. At 100 km ranges this equates to laser powers of the order of a few tens of watts for the relaxed pointing requirements. This is comparable to the earlier calculation for the ground backgrounds, but with the extra water absorption from the increased path length in the atmosphere. This data can also be used to determine the detection capability of configurations using reflectors afixed to satellites or airborne platforms by determining the required "magnitude" of the reflector; because of the return path, laser power requirements will be higher.

What is claimed is:

1. A long range large coverage area tomographic atmospheric sensing system comprising:

a first and second mobile craft, wherein either of said mobile craft is at least one of a group consisting of aircraft platforms and spacecraft platforms;

wherein said first mobile craft further contains a transmitting system with a laser transmitting at least frequencies f1 and f2;

wherein said second mobile craft further contains a detector;

wherein said transmitting system further comprises a servo control loop system comprising a probe beam and a quadrant detector;

wherein said quadrant detector detects said probe beam after it returns from a reflector on said second mobile craft whence it is inputted as a signal into said servo control loop for providing correction signals ensuring said laser and said detector are optically linked and track-locked;

wherein only after said first and second mobile craft are track-locked will said first and second mobile craft commence movement to measure said atmosphere;

wherein said frequency f2 is tuned to a center of an absorption line of an atmospheric trace substance;

wherein the frequency f1 is relatively unabsorbed and functions as a reference signal for transmitted, absorbed, scattered and radiated energy;

wherein said laser is swept through said atmosphere by movement of at least one of the mobile craft with sufficient angular diversity to provide measurements allowing tomographic reconstruction of the three dimensional distribution of said atmospheric trace substance by solving a set of linear coupled equations; and means to calculate a concentration and distribution of said atmospheric trace substance from said absorption measurements to determine a location of a source of said trace substance.

2. An atmospheric sensing apparatus of claim 1 wherein said atmospheric trace substance is one of a group consisting of toxic plumes, airborne pollutants, characteristic emissions of military targets, and low concentrations of natural and manmade substances.

3. An atmospheric sensing apparatus of claim 1 wherein said servo control loop system and said laser transmitting system with said detector are the same system.

4. An atmospheric sensing apparatus of claim 1 wherein said transmitting system on said first mobile craft is used to illuminate an atmospheric region and said detector on said second mobile craft samples transmitted, absorbed, scattered and radiated energy to detect the presence of said atmospheric trace substance in the volume defined by the overlap of said illuminated atmospheric region and the field of view of said detector.

* * * * *